US009426444B2

(12) United States Patent
Guigues et al.

(10) Patent No.: US 9,426,444 B2
(45) Date of Patent: Aug. 23, 2016

(54) DEPTH MEASUREMENT QUALITY ENHANCEMENT

(75) Inventors: Laurent Guigues, Brussels (BE); Michel Samuel, Pulau Batam (ID); Julien Thollot, Woluwe-Saint-Lambert (BE)

(73) Assignee: SOFTKINETIC SOFTWARE, Brussels (BE)

( * ) Notice: Subject to any disclaimer, the term of this patent is extended or adjusted under 35 U.S.C. 154(b) by 427 days.

(21) Appl. No.: 14/127,827

(22) PCT Filed: Jun. 22, 2012

(86) PCT No.: PCT/EP2012/062174
§ 371 (c)(1),
(2), (4) Date: May 12, 2014

(87) PCT Pub. No.: WO2012/175731
PCT Pub. Date: Dec. 27, 2012

(65) Prior Publication Data
US 2014/0253679 A1    Sep. 11, 2014

(30) Foreign Application Priority Data
Jun. 24, 2011 (EP) ..................................... 11171408

(51) Int. Cl.
*H04N 13/00* (2006.01)
*G01S 17/89* (2006.01)
*G06T 5/00* (2006.01)

(52) U.S. Cl.
CPC ............ *H04N 13/0022* (2013.01); *G01S 17/89* (2013.01); *G06T 5/005* (2013.01); *G06T 2207/10028* (2013.01); *H04N 2013/0081* (2013.01)

(58) Field of Classification Search
CPC ........................ H04N 13/0022; H04N 19/597
See application file for complete search history.

(56) References Cited

U.S. PATENT DOCUMENTS 5,751,290 A    5/1998    Lee et al.
6,577,307 B1   6/2003    Hsiao et al.
(Continued)

OTHER PUBLICATIONS

European Patent Office International Search Report and Written Opinion dated Sep. 14, 2012, International Application No. PCT/EP2012/062174 (4 pages).
(Continued)

*Primary Examiner* — Tung Vo
*Assistant Examiner* — Rowina Cattungal
(74) *Attorney, Agent, or Firm* — Koppel, Patrick, Heybl & Philpott

(57) ABSTRACT

Described herein is a method for correcting defective depth values in depth map images. Defective values correspond to "noisy pixels" located on continuous flat surfaces and interpolated "flying pixels" located along an edge between a foreground object and a background object. The method comprising the steps of accessing a depth map of a scene which includes the foreground and background objects, detecting and identifying noisy and interpolated depth measurements within the depth map using a method, defining and applying a correction to each of the detected defective noisy and interpolated depth measurements using a specifically defined weighted correction factor. By providing the corrected defective depth values in depth map images, edges are sharpened in depth and continuous surfaces are flattened, enabling higher efficiency and robustness of further image processing.

19 Claims, 6 Drawing Sheets

(56) References Cited

U.S. PATENT DOCUMENTS

| | | | |
|---|---|---|---|
| 2010/0215251 A1* | 8/2010 | Klein Gunnewiek | H04N 13/0022 382/154 |
| 2012/0082368 A1 | 4/2012 | Hirai et al. | |
| 2012/0127267 A1* | 5/2012 | Zhang | G06T 7/0071 348/43 |
| 2014/0002596 A1* | 1/2014 | Antonio | H04N 19/597 348/43 |

OTHER PUBLICATIONS

European Patent Office International Preliminary Report on Patentability dated Sep. 23, 2013, International Application No. PCT/EP2012/062174 (24 pages).

Yin Zhao, et al., "Boundary Artifact Reduction in View Synthesis of 3D Video: From Perspective of Texture-Depth Alignment", IEEE Transactions on Broadcasting, vol. 57, No. 2, Jun. 1, 2011, pp. 510-522 (13 pages).

Qingxiong Yang et al., "Spatial-Depth Super Resolution for Range Images," 2007 IEEE Conference on Computer Vision and Pattern Recognition; Jun. 1, 2007, pp. 1-8 (8 pages).

Hanqi Fan et al., "Robust Feature-Preserving Mesh Denoising Based on Consistent Subneighborhoods," IEEE Transactions on Visualization and Computer Graphics, vol. 16, No. 2, Mar. 1, 2010, pp. 312-323 (13 pages).

Deliang Fu et al., "Temporal Consistency Enhancement on Depth Sequences," 28th Picture Coding Symposium 2010, Dec. 8, 2010 (4 pages).

Sergey Smirnov et al., "Methods for Depth-Map Filtering in View-Plus-Depth 3D Video Representation," EURASIP Journal on Advances in Signal Processing 2012, Jan. 25, 2012, retrieved Sep. 6, 2012, URL: http://asp.eurasipjournals.com/content/pdf/1687-6180-2012-25.pdf (21 pages).

Jakob Wasza et al., "Real-time Preprocessing for Dense 3-D Range Imaging on the GPU: Defect Interpolation, Bilateral Temporal Averaging and Guided Filtering," 2011 IEEE International Conference on Computer Vision Workshops, Nov. 6, 2011, pp. 1221-1227 (7 pages).

* cited by examiner

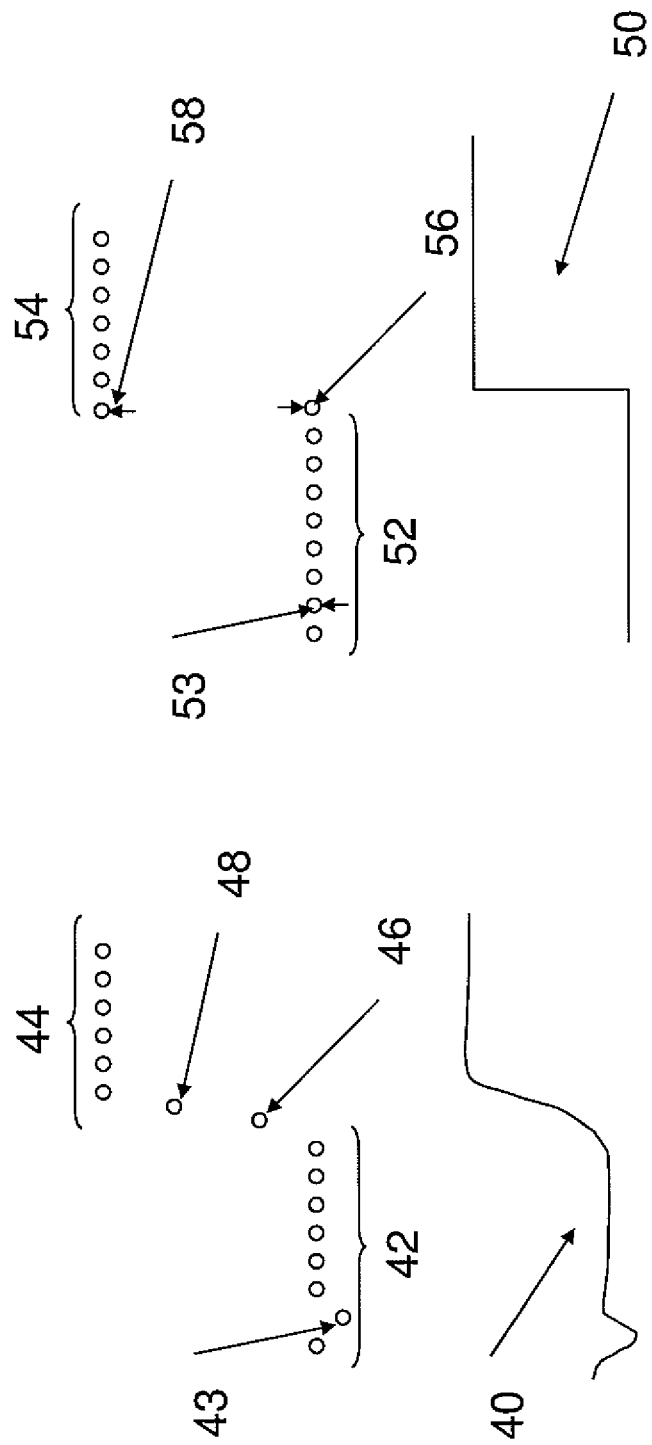

DEPTH MEASUREMENT QUALITY ENHANCEMENT

FIELD OF THE INVENTION

The present invention relates to quality enhancement of range finding measurements, such as depth maps or images containing "three-dimensional point cloud" data information, and is more particularly concerned with de-noising of depth measurements and the correction of problematic interpolated depth values associated with pixels corresponding to an edge between a foreground object and a background object in an imaged three-dimensional scene.

BACKGROUND TO THE INVENTION

Depth measurement camera systems are recent range finding measurement devices which have become more popular due to technologies used for gesture recognition and human skeletal tracking in consumer electronics systems and in console games.

Mainly, there are two types of environment lighting independent depth sensing or three-dimensional (3D) camera technologies that are suitable for such applications. One type of 3D camera technology is the structured light 3D camera, for example, provided by PrimeSense, used for gesture recognition in Microsoft's Kinect for Xbox 360 (known as Kinect) video game console. (Microsoft, Kinect, and Kinect for Xbox 360 are trademarks of the Microsoft Corporation.) A second type of 3D sensing camera technology is the time-of-flight (ToF) camera developed and manufactured by several independent companies and which is used, for example, in the automotive industry or for gesture recognition and human skeletal tracking in various environments comprising human to machine interactions, such as in video games, robotic, home automation etc.

However, regardless of the type of 3D sensing camera, an image of a scene is provided that comprises a plurality of pixels, each pixel of the image containing at least information relating to the distance of the imaged object to the camera, such information being the depth value measured. Such an image embedding at least depth measurement information is termed a "depth map". Other types of images may also include embedded depth measurement information, for example, a "3D point cloud" data matrix where images include embedded information with respect to a camera coordinate system or with respect to a virtual environment coordinate system. In such images, x and y correspond respectively to the horizontal and vertical axis and the z-axis corresponds to the depth. Transformation from a camera coordinate system to a virtual environment coordinate system is a matter of projections, and, such transformations are generally referred to as "scene calibration".

An article entitled "Boundary Artifact Reduction in View Synthesis of 3D Video: From Perspective of Texture-Depth Alignment", Yin Zhao et al., IEEE Transactions on Broadcasting, IEEE Service Center, Piscataway, N.J., US, Vol. 57, No. 2, 1 Jun. 2011, pages 510-522, discloses a method in which boundary artefacts present in a view synthesised depth map are corrected using a process termed suppression of misalignment and alignment enforcement (SMART). The process requires the use of both depth information and texture in a pre-processing step to provide hole filling in a virtual view created from at least two stereoscopic images. For a foreground-background boundary, derivatives are obtained using two pixels either side of the pixel to be corrected and the values are compared to a threshold value to determine if the pixel falls within the foreground or the background. Distances between edge points and depth edge points are averaged to provide a smooth curve parallel to the depth or texture edge.

In an article entitled "Spatial-Depth Super Resolution for Range Images", Qingxiong Yang et al., CVPR '07, IEEE Conference on Computer Vision and Pattern Recognition, 18-23 Jun. 2007, Minneapolis, Minn., USA, IEEE Piscataway, N.J., US, Vol. 57, No. 2, 1 Jun. 2007, pages 1-8), a post-processing technique is described in which a 3D volume of depth probability (referred to as the cost volume) is processed by iteratively applying a bilateral filter to slices of the cost volume to generate a new cost volume which is then used to refine the depth resolution for general two-view stereo vision problems. The steps of the post-processing technique include up-sampling of a low-resolution depth map to the same size as a high-resolution camera image, building a cost volume based on the up-sampled depth map, and applying a bilateral filter to slices of the cost volume to generate a new cost volume, a refined depth map is based on the new cost volume.

An article entitled "Robust Feature-Preserving Mesh Denoising Based on Consistent Subneighborhoods", Hanqi Fan et al., IEEE Transactions on Visualization and Computer Graphics, IEEE Service Center, Los Alamitos, Calif., US, Vol. 16, No. 2, 1 Mar. 2010, pages 312-324) discloses a method of identifying piecewise smooth sub-neighbourhoods using a density-based clustering algorithm. An initial estimate of vertex normals and curvature tensors is determined by fitting a quadric model which is then filtered to smooth the normal field and curvature tensor field. A second bilateral filtering is then used to preserve curvature details and alleviate volume shrinkage during denoising.

In an article entitled "Temporal Consistency Enhancement on Depth Sequences", Deliang Fu et al., Picture Coding Symposium 2010; Nagoya, 8 Dec. 2010) discloses a depth filtering algorithm to remove temporal inconsistencies in depth sequences.

U.S. Pat. No. 6,577,307 describes an anti-aliasing process in which a weighting value is used to blend foreground colour with the nearest background colour. The weighting value for each pixel indicates the percentage of coverage of that pixel.

Any application or system that makes use of images providing depth measurements is then dependent on measurement quality in terms of resolution, noise, accuracy, robustness and repeatability. In particular, when mainly considering 3D ToF camera technologies, depth measurements around scene object edges are known to demonstrate convolution and/or interpolation artefacts also termed "flying pixels" which may affect depth data in at least one-pixel radius for a single naturally sharp edge. Such "flying pixels" are spatial artefacts independent from any potential motion blur at occurring in locations at edges of an object, and need to be removed and/or restored to a correct location in the scene which corresponds to a newly computed depth value, the newly computed depth value properly assigning the "flying pixel" to either the foreground object or to the background object. The aim of such restoration is to improve significantly subsequent object detection confidence and enhance depth information quality of objects within the 3D scene.

SUMMARY OF THE INVENTION

It is therefore an object of the present invention to provide a method and system of enhancing the quality of range finding measurements, for example, such measurements provided in the form of a depth map or of a 3D point cloud, by detecting defective pixels which may be in the form of noisy pixels values and/or in the form of interpolated "flying pixels" values. In particular, noisy pixels values relate to the entire depth map. However, they tend to reduce the quality of flat and continuous surfaces. "Flying pixels" values relate to edges of 3D objects represented in the depth map or in the corresponding 3D point cloud, these edges being defined as limits in between a foreground object and a background object located at a different depth.

In accordance with one aspect of the present invention, there is provided a method for depth map quality enhancement of defective pixel values in a three-dimensional image, the method comprising the steps of:— a) determining depth measurement data relating to a scene;

b) detecting defective pixels within the depth measurement data by determining and using, for each pixel, depth related directional derivatives in at least one direction;

c) defining a depth correction for each detected defective pixel; and d) applying the depth correction to the depth measurement data of each detected defective pixel;

characterised in that step c) preferably comprises, for each identified defective pixel, the steps of:

c1) determining a vector in relation to at least one of the depth related directional derivatives;

c2) determining the normal to the determined vector;

c3) determining a weighting factor using at least one of the determined vector and the normal to the determined vector; and c4) determining a correction factor using at least one of the weighting factor and the information relating to neighbouring pixels.

By using the method of the present invention, a significant enhancement of depth map or 3D point cloud image quality can be obtained as the depth measurement noise can be specifically reduced. In particular, the information contained in the interpolated "flying pixels" located at edges of objects is restored and these edges are then consequently sharpened so that to made them relevant and useful for further signal processing methods.

In addition, one consequence of the present invention is that user and object detection, identification, tracking, as well as motion related data analysis such as gesture recognition performed on object of interest within a three-dimensional scene, is greatly improved as such methods are dependent of the depth map depth data value quality. As another result, extraction of images relating to user shapes and object shapes within a scene can be performed more easily with better reliability and accuracy.

In addition, the improved detection of objects also provides significantly better modelling of the user and objects within the 3D scene, in particular, human skeletal fitting and tracking is also significantly improved as merging of body parts of a user with objects or with itself is minimised and the body shape of the user can more accurately be modelled.

In one embodiment, step c4) may further comprise using at least one of depth values, weighting factors, and correction factors of the neighbouring pixels. Alternatively or additionally, step c4) may comprise using a statistical mode of the information relating to neighbouring pixels.

Advantageously, step c4) uses only valid neighbouring pixels.

Step c4) may further comprise using the depth information extracted from a regressive plane determined over the neighbouring pixels.

In one embodiment of the present invention, the defective pixels may comprise interpolated pixel data values located at edges between a foreground object and a background object in the three-dimensional image. In this case, step b) may further comprise using the depth related directional derivatives to identify defective depth measurements of pixels at edges when at least one depth directional derivative of a pixel is greater than a predetermined threshold and if at least two consecutive directional derivatives have the same sign. This provides a test for the "flying pixels" as described above.

In addition to correcting for "flying pixels", the method of the present invention also corrects for "noisy pixels". In this case, step b) comprises determining defective measurements of pixels on continuous surfaces within the three-dimensional image.

In this case, step b) further comprises using the depth related directional derivatives to identify defective depth measurements of pixels on a continuous surface when at least one depth directional derivative of a pixel is greater than a predetermined threshold and when another depth directional derivative of that pixel is also greater than a predetermined threshold, the two directional derivatives having opposite signs.

Where the defective pixels are "noisy pixels", step c) may further comprise, for each identified defective pixel, the steps of:

c5) determining a vector in relation to the depth directional derivatives data values using two orthogonal axes;

c6) determining a weighting factor parameter using at least one of a radius value of the determined vector, normal information to the determined vector, and real width in scene represented by the pixel; and c7) applying a correction factor using the determined weighting factor parameter in combination with information relating to neighbouring pixels.

In one embodiment, the depth related directional derivatives are determined using at least two orthogonal axes. In another embodiment, the depth related directional derivatives are determined using a normal map. In another preferred embodiment, the depth related directional derivatives may be used for determining a normal map.

In one embodiment of the present invention, the method is used to correct for at least one of the "flying pixels" and "noisy pixels", and in a preferred embodiment, the method corrects for "flying pixels" and for "noisy pixels".

Step a) may comprise accessing depth measurement data provided by a 3D sensing device or camera or from a storage media in the form of a depth map, in the form of a 3D point cloud or in any other form.

BRIEF DESCRIPTION OF THE DRAWINGS

For a better understanding of the present invention, reference will now be made, by way of example only, to the accompanying drawings in which:—

FIG. 4 illustrates a schematic representation of depth value signal together with pixel locations;

FIG. 5 is similar to FIG. 4 but illustrates the depth value signal and pixel locations after correction in accordance with the present invention;

DESCRIPTION OF THE INVENTION

Figure 1:
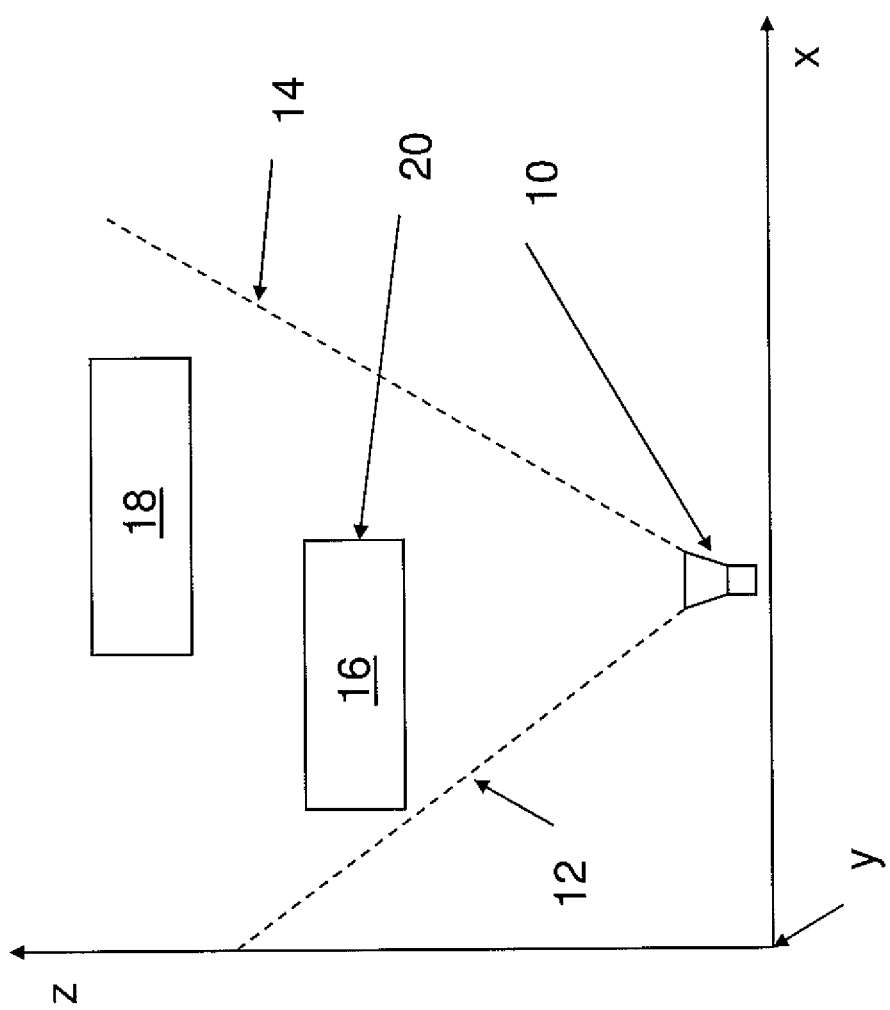
FIG. 1 illustrates a schematic two-dimensional top view of a three-dimensional scene.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

For a typical time-of-flight (ToF) 3D camera, the process of computing distance or depth data using TOF principles involves a combination of optical and electronic apparatus with analogue and digital processing units. Typically, an amplitude modulated (AM) infrared (IR) signal is sent out to the scene by the illumination system embedded in the ToF camera device. A dedicated sensor synchronously registers the IR intensity reflected from objects in the scene as a function of phase. The signal from the sensor then is integrated over time and use is made of phase delay computations to estimates depth value measurements for each pixel. ToF 3D images may be limited by their resolution determined in accordance with the sensor resolution and the field of view of the lens, their depth measurement accuracy determined in accordance with the modulation frequency of the light, the amount of light reflected by the scene and parameters associated with the imaging system, for example, the optical engine quality, the combination of optical, electronic and signal processing apparatus that basically creates some quantisation artefacts and noise in the measurement, and more problematically, some interpolated depth measurements leading basically to "fuzzy" edges in depth map. Such pixels in the "fuzzy" edges are also called "flying pixels".

The present invention is related to a method and system for resolving the "noisy" and "flying pixels", collectively termed "defective pixels", so that their depth measurement values in the depth map are corrected to correspond as much as possible to matter present in the scene. The method and system has an input comprising an image embedding depth related measurements, in the form of a phase map, a depth map or a 3D point cloud, provided by a 3D sensing camera, a media storage device or media via the internet. Specific signal processing is applied to input depth data of the 3D image to correct for both "noisy" and interpolated "flying pixels" with respect of some specific depth gradient measurements, vector and geometrical constrained computations, thresholds, and more specifically weighted convolution. The resulting output provides a reconstructed depth map image that comprises less noise, and significantly less interpolated "flying pixels" around scene objects having edges along the z-axis or depth axis. The enhanced and/or corrected image is then intended to be used by 3D imaging applications instead of the original input 3D image provided by the 3D camera device or other 3D imaging system enabling better operability and efficiency of such applications.

Referring initially to FIG. 1, a two-dimensional (2D) top view of a scene is shown in an x-z plane. A camera 10 has field of view defined by dotted lines 12, 14 in which a foreground object 16 and a background object 18 are present. An edge 20 of the foreground object 16 may generate "flying pixels" with respect to the background object 18 as will be described with reference to FIG. 3.

Figure 2:
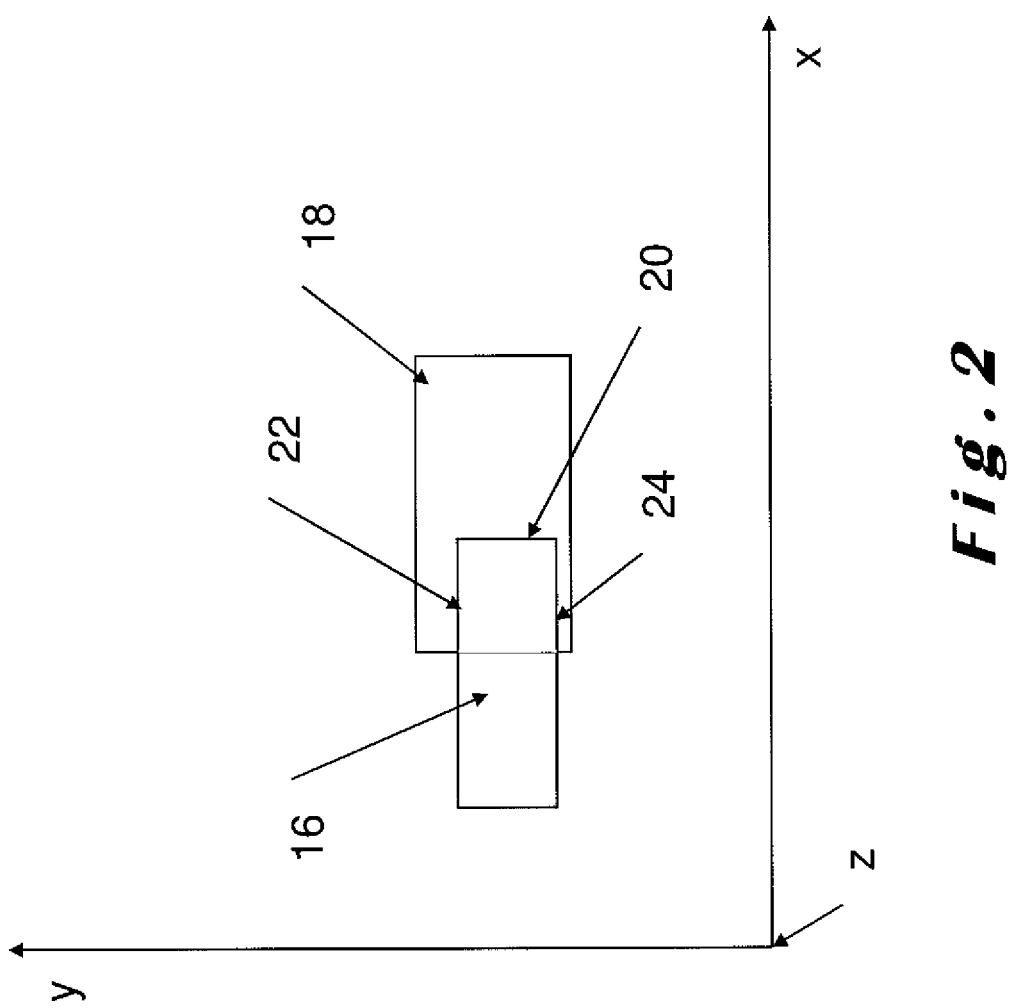
FIG. 2 illustrates a schematic two-dimensional front camera view of the three-dimensional scene of FIG. 1.

FIG. 2 is a 2D front camera view of the 3D scene defined in FIG. 1 with the foreground object 16 and the background object 18 in the x-y plane. In this view, the edge 20 is well defined and sharp between the foreground object 16 and the background object 18. Although only edge 20 is shown, it will be appreciated that "flying pixels" may also be present at the top and bottom edges 22, 24 where the foreground object 16 overlaps the background object 18. In addition, it is understood that flat continuous surface of object 16 and 18 may also exhibit some noisy pixels due to the camera sensor performances.

Figure 3:
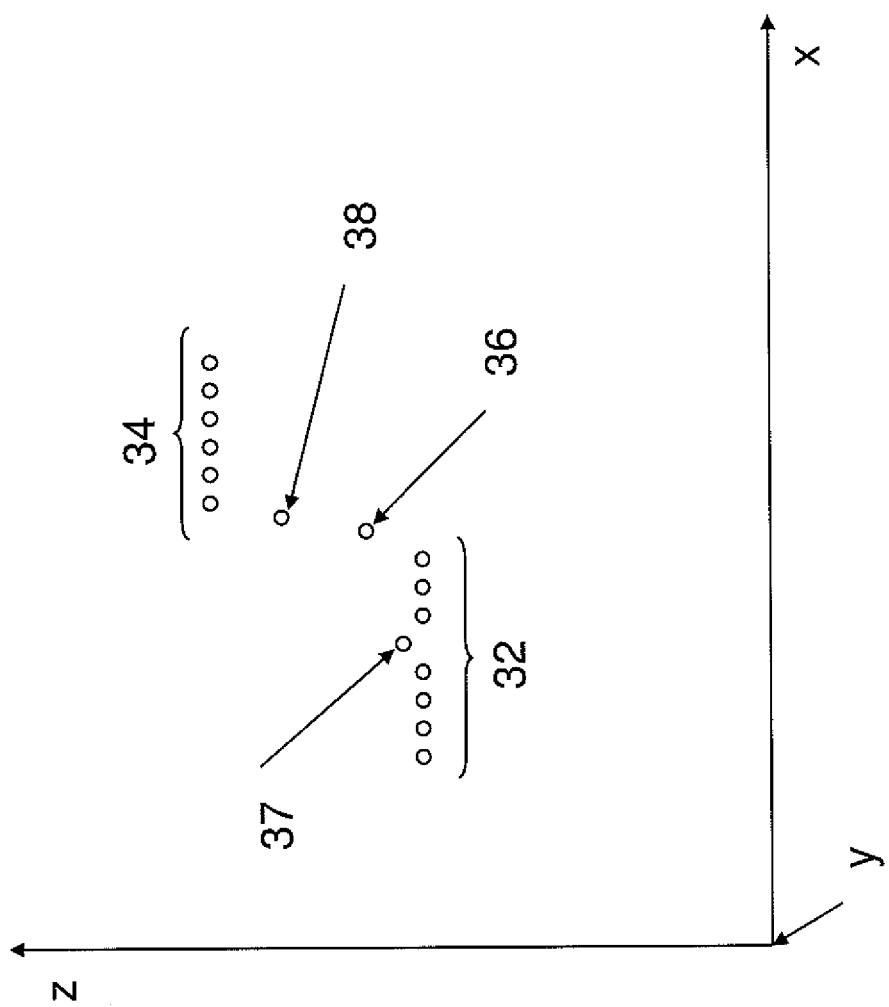
FIG. 3 illustrates a schematic representation of three-dimensional data measurement for the two-dimensional top view of FIG. 1.

FIG. 3 illustrates the foreground object 32 and the background object 34 in terms of pixels corresponding to the image shown in FIG. 1. As shown, two "flying pixels" 36, 38 are located on the edge between the foreground object 32 and the background object 34. Both of these "flying pixels" may belong to either the foreground objection 32 or the background object 34, or only one belongs to the foreground object 32 and one belongs to the background object 34. Foreground object 32 is a continuous flat surface object, the measurements of which showing at least one noisy pixel 37.

FIG. 4 is similar to FIG. 3 but also shows a signal 40 relating to the depth map. As shown, in signal 40, the lower line corresponds to the foreground object indicated by pixels 42, the upper line corresponds to the background object indicated by pixels 44, and the slope between the lower and upper lines corresponds to the "flying pixels" 46, 48. A blip in the lower line corresponds to a "noisy pixel" 43 in the foreground object indicated by pixels 42.

After processing in accordance with the present invention, the "noisy pixel" 43 and the "flying pixels" 46, 48 are corrected as shown in FIG. 5. As shown in FIG. 5, signal 50 is more defined having a straight lower line corresponding to pixels 52 and a straight upper line corresponding to pixels 54. The "noisy pixel" shown as 43 in FIG. 4 is now corrected as shown by pixel 53 and the "flying pixels" 46, 48 have been correctly assigned to pixels 52 corresponding to the foreground object (pixel 56) and pixels 54 corresponding to the background object (pixel 58).

Figure 6:
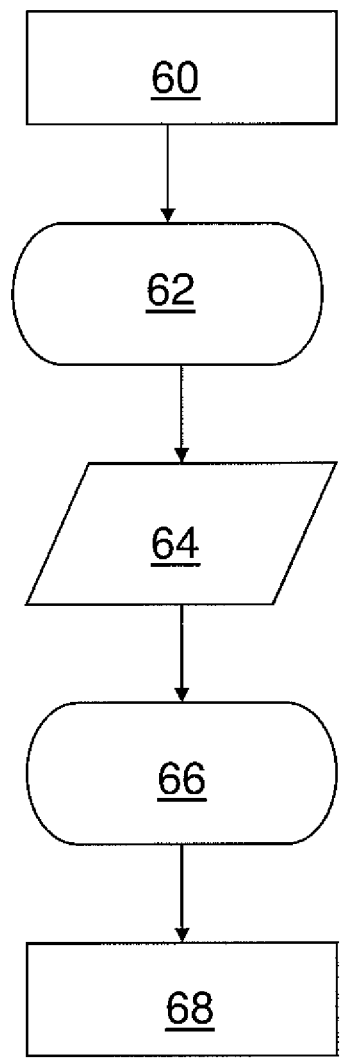
FIG. 6 illustrates a flow chart of the steps in depth map de-noising and the edge correction method in accordance with the present invention.

In FIG. 6, a flow chart is shown that illustrates the main steps of one embodiment of the method of the present invention. In step 60, an input depth map or 3D point cloud is obtained. The depth map or 3D point cloud may be obtained directly from a 3D camera, from a media storage device or from the internet. In step 62, "noisy pixels" and interpolated "flying pixels", collectively termed "defective pixels", are detected. A de-noising correction factor is determined for each pixel that has been determined as being a "noisy pixel", and, the correction factor is applied with respect to neighbouring pixels, step 64. Determination of a correction factor for each pixel that has been determined as being a "defective pixel", step 66, is then performed and applied. In step 66, the correction is carried out with respect to foreground object and background object depth values. In steps 64 and 66, such determination of correction factors may include using statistical modes where the value assigned to the pixel being corrected are determined in accordance with at least one of the mean, median, and/or mode values of neighbouring pixels. The restored depth map or 3D point cloud is then output (step

68). The output from step 68 can be used in any application where an accurate and reliable depth map is required or preferred.

The method of the present invention comprises two main steps, namely, detecting "noisy pixels" and interpolated "flying pixels", and correcting both the detected "noisy pixels" and "flying pixels".

For the detection of both "noisy pixels" and interpolated "flying pixels", a first step uses directional derivatives around a point to decide whether a pixel is "noisy" or not or "flying" or not, the point corresponding to the pixel being evaluated. Preferably, all of the depth image pixels are evaluated. These directional derivatives can be multi-directional but for ease of description only vertical and horizontal directions are described below. It will however be appreciated that the same principles apply to other directions. In addition, other methods may be applied instead of using directional derivatives.

If "P" is the pixel being evaluated in the depth map and "a" is a chosen direction in the plane, then da(P) will be the value of the derivative at pixel "P" in direction "a". A pixel is declared to be "flying" if the absolute values, |da(P)| and |da+π(P)|, of the directional derivatives exceed a predefined threshold in direction "a" and if the sign of da(P) and da+π(P) are the same. A pixel is declared to be "noisy" if it has a depth value that is significantly different from all neighbouring pixels, in particular, if at least one directional derivative exceeds a predefined threshold and if at least two direction derivatives have the opposite sign. Either the "noisy pixel" test or the "flying pixel" test can be performed for an arbitrary number of directions for each pixel. Ideally, the directions should cover a unit circle, that is, a circle of one pixel radius. Typically, a set of directions, {a_i}, where i=1 to n can be used with:

$$a\_i = (i-1)*\pi/n$$

Figures 7, 8:
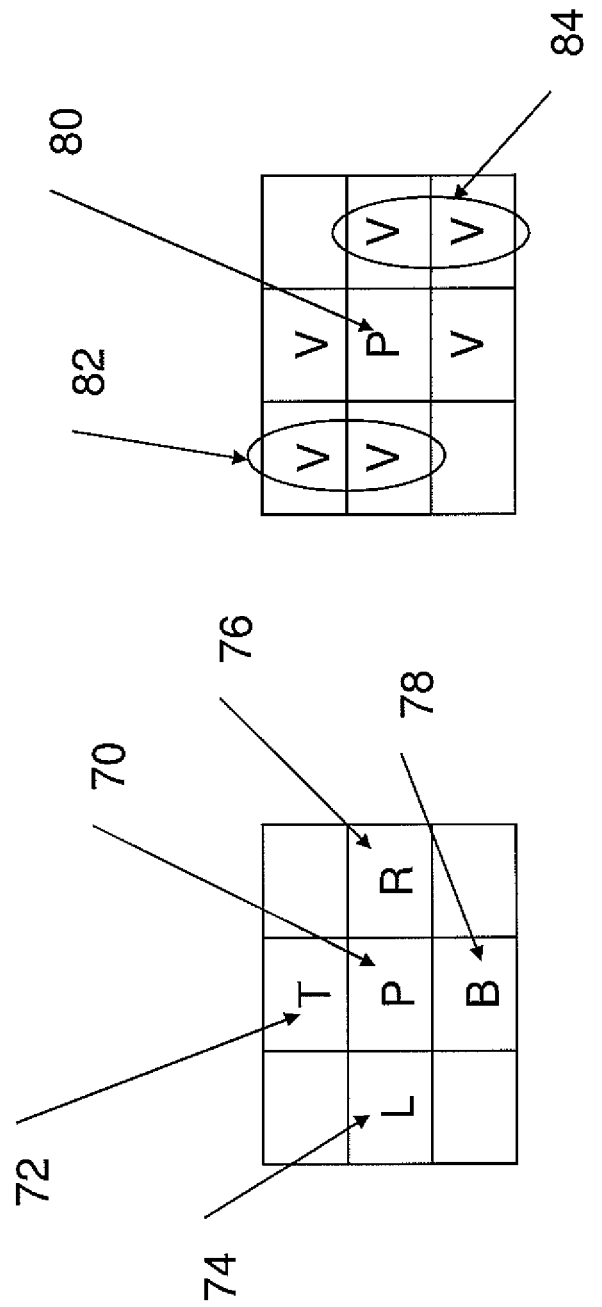
FIG. 7 illustrates a 3×3 kernel centred on a "flying pixel" with adjacent pixels in two orthogonal axes.
FIG. 8 illustrates a 3×3 kernel centred on a "flying pixel" with neighbouring pixels determined as being valid and forming part of a foreground or a background object image.

Directional derivatives can be simply estimated by finite differences. In FIG. 7, a pixel 70 is the pixel "P" being evaluated with pixels 72, 74, 76, 78 corresponding to the pixels to the top "T", to the left "L", to the right "R" and to the bottom "B" of the pixel "P". The values of pixels 72, 74, 76, 78 can be used to determine whether the pixel is "flying" or not and whether the pixel is "noisy" or not, in two directions, namely, at angles of 0° and π/2 (horizontal and vertical directions).

For these two directions, the "noisy pixel" test reduces to $$(|R-P|<Th \text{ and } |L-P|<Th) \text{ or } (|T-P|<Th \text{ and } |B-P|<Th)$$

and $$\text{sign}(R-P) \neq \text{sign}(P-L) \text{ or } \text{sign}(T-P) \neq \text{sign}(P-B)$$

The "flying pixel" test reduces to $$(|R-P|>kTh \text{ and } |L-P|>kTh) \text{ or } (|T-P|>kTh \text{ and } |B-P|>kTh)$$

and $$\text{sign}(R-P) = \text{sign}(P-L) \text{ or } \text{sign}(T-P) = \text{sign}(P-B)$$

where Th is the threshold value applied and k is a predetermined weighting factor. For example, a Th value of 0.08 m can be used, but it will be appreciated that any other suitable value can be used. As an alternative to the "flying pixel" test and the "noisy pixel" test given above, the following can be used instead:

$$|L-R|>Th \text{ and } |T-B|>Th$$

In this latter case, the value of the threshold may be larger than that given in the previous test as it uses the values between two pixels surrounding the pixel being evaluated.

"Noisy pixels" and "flying pixels" having been identified, a second step estimates new depth values for applying individual correction to each of the identified "noisy pixels" or "flying pixels". Correction can be carried out in a single pass within a single process. For a better understanding, the correction steps are described as being sequential with respect to time.

All "flying pixels" and "noisy pixels" are first flagged as being invalid. In particular, when using a ToF camera, other pixels that may be judged (that is, using thresholding) as unreliable for other reasons, for example, bad confidence, low IR illumination, can also be flagged as invalid and their depth can also be re-estimated using the method of the present invention.

The principle is to use valid surrounding pixels of an invalid pixel to estimate the new depth of the invalid pixel. This is shown in FIG. 8 where a pixel 80 being evaluated in relation to surround valid pixels as shown by pixel pairs 82, 84. Although pairs of pixels are shown for the evaluation, it will be understood that any suitable number of valid pixels can be used for the determination.

In FIG. 8, valid pixels surrounding an invalid "flying pixel", "P", are indicated by "V". However, for this estimation, only valid pixels of either the foreground, indicated by 82, or valid pixels of the background, indicated by 84, are used, and not a combination of valid pixels from both the foreground and the background. Pixels 82 will have a smaller depth value than "P" and pixels 84 will have a larger depth value than "P".

For a "noisy pixel", the pixel is valid but having been identified as being "noisy", the same process as described above for "flying pixels" is carried out on the "noisy pixel".

The selection of which valid pixels to use for the estimation evaluates a preference for the invalid point being either in the foreground object or in the background object. The preference mode can be determined, for example, by mapping the "flying pixels" in accordance with the minimum amount of correction needed to their depth value, by setting the "flying pixel" to the foreground object if its distance from the camera exceeds a predetermined threshold, or by setting the "flying pixel" to the background object if its distance to the camera is less than the predetermined threshold. If a preference for a foreground object is used, and the set of valid foreground object pixels is not empty, then the new depth value of "P" will be estimated only based on those valid foreground object pixels. If the set of valid foreground object pixels is empty and the set of valid background object pixels is not empty, then the new depth value of "P" will be estimated only based on valid background object pixels. If both sets relating to valid foreground and background object pixels are empty, then the pixel cannot be corrected and it remains invalid. Similarly, if a preference for a background object is used, if the set of valid background object pixels is not empty, then the new depth value of "P" will be estimated only based on those valid background object pixels. If the set of valid background object pixels is empty and the set of valid foreground objet pixels is not empty, then the new depth value of "P" will be estimated only based on the set of valid foreground object pixels. If both sets relating to valid background and foreground object pixels are empty, then the pixel cannot be corrected and it remains invalid.

The estimation of the depth value of "P" from a set of surrounding pixels (either from the foreground object or the background object) can be made by a variety of means, including applying a weighting factor, any interpolation method using statistical determinations or using a regression plane.

In one embodiment of the present invention, a regression plane based on valid foreground pixels is utilised. The depth value of the regression plane at point p is assigned as the new depth value for pixel In another embodiment, the mean depth value of valid pixels in foreground object is determined and assigned as new depth value for pixel "P". As alternatives, the minimum, the maximum, the median or the mode of the depth values of the valid foreground object pixels and/or valid background object pixels can be used. Different estimation methods can be used for the set of valid foreground object pixels and the set of valid background object pixels. For example, the maximum depth value of the valid pixels in the set may be used if the estimation relies on valid foreground object pixels, and the minimum depth value of the valid pixels in the set may be used if the estimation relies on valid background pixels.

All invalid pixels whose depth values have been successfully estimated by the method, that is, all invalid pixels that have at least one valid neighbouring pixel, are flagged as being valid. The method can be repeated iteratively to allow all invalid pixels in the depth map to be reconstructed provided that at least one pixel is flagged as valid at the beginning of the process.

However, in order to improve the reliability of "flying pixel" identification and correction, noise needs to be removed from the depth map produced by the camera. This may be achieved by first determining $\omega_i$ for each pixel and then using a 3×3 weighted $\omega_i$ kernel for each pixel. Multiple passes may be applied with or without re-computing the kernel $\omega_i$ parameters.

Referring again to FIG. 8, the following equations can be used to determine a normal angle from the depth field:—

$$\partial x = (L-P)/2 + (P-R)/2 = (L-R)/2 \quad (1)$$

$$\partial y = (T-P)/2 + (B-R)/2 = (T-B)/2 \quad (2)$$

$$dz = \sqrt{(dx^2 - dy^2)/4} \quad (3)$$

$$dw = \text{width of } P \quad (4)$$

$$r = \sqrt{(dz^2 + dw^2)} \quad (5)$$

$$\omega_i = a\cos(dz/r) \quad (6)$$

Equations (1) and (2) relate to the gradient $\partial z(x)$ and $\partial z(y)$ and equation (3) provides the radius in terms of the gradient. Equation (4) gives the width of the pixel "P" as stated and equations (5) and (6) provide the normal radius and the normal angle respectively.

Other methods can be used for computing, estimating or retrieving the normal angle, for example, from the camera if available, can also be used depending on the camera, signal and platform characteristics.

For example, for computation efficiency, cpi from a depth map can be determined as:—

$$\omega_i = a\cos(a\tan(dz/dw)) = 1/\sqrt{(1+(dz/dw)^2)}$$

In general, the function $\omega_i = Fw(dz)$ is termed a window function.

After the noise removal pass, a field gradient is calculated and the sign of second derivative $d^2z$ is used as a local disjunction parameter. Partial second degree derivative $d^2z$ is computed as the difference between derivative $dz$ at both extremities of the gradient vector in projected space.

A weighted $\omega_i$ 3×3 bipolar kernel is then applied in n passes, where $n \geq 1$. The disjunction parameter serves as group identification within the kernel; and pixel values of same sign will be averaged together while ignoring pixels with opposite sign.

This principle is improved to allow non-signed (i.e. equal to 0) values for the disjunction parameter such that those points can be averaged with both signs. This improvement allows a threshold value to be applied to the disjunction parameter, for example, using $\partial^2 z$ or other data, such as, IR power, in an effort to reduce the noise that is introduced in the output signal by the disjunction.

This kernel may be applied multiple times to produce desired effect. Typically current TOF signals benefit best from two-pass processing.

To accelerate this disjunction and/or avoid multi-pass processing, a displacement map in gradient direction can be built to create local expansion. Individual depth values can be used as well as local minima and/or maxima values. However, noise in the output signal and disjunction rate desired will decide which expansion method to use.

The invention claimed is:

1. A method for depth map quality enhancement of defective pixel depth data values in a three-dimensional image, the method comprising the steps of:
   a) determining depth measurement data relating to a scene;
   b) detecting defective pixels within the depth measurement data by determining and using, for each pixel, depth related directional derivatives in at least one direction;
   c) defining a depth correction for each detected defective pixel; and
   d) applying the depth correction to the depth measurement data of each detected defective pixel;
   characterised in that the defective pixels comprise interpolated pixel data values located at edges between a foreground object and a background object in the three-dimensional image, and wherein step b) further comprises using the depth related directional derivatives to identify defective depth measurements of pixels at edges when at least one depth directional derivative of a pixel is greater than a predetermined threshold and if at least two consecutive directional derivatives have same sign; and
   in that step c) comprises, for each identified defective pixel, the steps of:
   c1) determining a vector in relation to at least one of the depth directional derivatives;
   c2) determining the normal to the determined vector;
   c3) determining a weighting factor parameter using at least one of the determined vector and the normal to the determined vector; and
   c4) determining a correction factor using at least one of the weighting factor parameter and the information relating to neighbouring pixels.

2. A method according to claim 1, wherein step c4) uses only data values of valid neighbouring pixels.

3. A method according to claim 1, wherein step c4) further comprises using at least one of depth values, weighting factors, and correction factors of the neighbouring pixels.

4. A method according to claim 3, wherein the depth related directional derivatives are determined using a normal map.

5. A method according to claim 3, wherein the depth related directional derivatives are used for determining a normal map.

6. A method according to claim 1, wherein step c4) comprises using a statistical mode of the information relating to neighbouring pixels.

7. A method according to claim 6, wherein the depth related directional derivatives are determined using a normal map.

8. A method according to claim 6, wherein the depth related directional derivatives are used for determining a normal map.

9. A method according to claim 1, wherein step c4) further comprises using the depth information extracted from a regressive plane determined over the neighbouring pixels.

10. A method according to claim 9, wherein the depth related directional derivatives are determined using a normal map.

11. A method according to claim 9, wherein the depth related directional derivatives are used for determining a normal map.

12. A method according to claim 1, wherein the defective pixels comprise noisy pixel data values located in continuous surfaces of the three-dimensional image, and wherein step b) further comprises using the depth related directional derivatives to identify defective depth measurements of pixels on a continuous surface when at least one depth directional derivative of a pixel is greater than another predetermined threshold and when another depth directional derivative of that pixel is also greater than another predetermined threshold, the two directional derivatives having opposite signs.

13. A method according to claim 12, wherein step c) further comprises, for each identified defective pixel, the steps of:
 c5) determining a vector in relation to the depth directional derivatives data values using two orthogonal axes;
 c6) determining a weighting factor parameter using at least one of a radius value of the determined vector, normal information to the determined vector, and real width in scene represented by the pixel; and
 c7) applying a correction factor using the determined weighting factor in combination with information relating to neighbouring pixels.

14. A method according to claim 1, wherein the depth related directional derivatives are determined using at least two orthogonal axes.

15. A method according to claim 14, wherein the depth related directional derivatives are determined using a normal map.

16. A method according to claim 14, wherein the depth related directional derivatives are used for determining a normal map.

17. A method according to claim 1, wherein step c) further comprises, for each identified defective pixel, the steps of:
 c5) determining a vector in relation to the depth related directional derivatives data values using two orthogonal axes;
 c6) determining a weighting factor using at least one of a radius value of the determined vector, normal information to the determined vector, and real width in scene represented by the pixel; and
 c7) applying a correction factor using the determined weighting factor in combination with information relating to neighbouring pixels.

18. A method according to claim 1, wherein the depth related directional derivatives are determined using a normal map.

19. A method according to claim 1, wherein the depth related directional derivatives are used for determining a normal map.

* * * * *